United States Patent

Luginsland et al.

(10) Patent No.: US 6,984,683 B2
(45) Date of Patent: Jan. 10, 2006

(54) SILANE-MODIFIED OXIDIC OR SILICATE-LIKE FILLER, PROCESS FOR ITS PREPARATION, AND ITS USE

(75) Inventors: Hans-Detlef Luginsland, Cologne (DE); Andre Hasse, Linnich (DE); Karsten Korth, Wyhlen (DE)

(73) Assignee: Degussa AG, Duesseldorf (DE)

( * ) Notice: Subject to any disclaimer, the term of this patent is extended or adjusted under 35 U.S.C. 154(b) by 227 days.

(21) Appl. No.: 10/189,483

(22) Filed: Jul. 8, 2002

(65) Prior Publication Data

US 2003/0125419 A1 Jul. 3, 2003

(30) Foreign Application Priority Data

Jul. 6, 2001 (DE) ............................... 101 32 943

(51) Int. Cl.
*C08K 3/18* (2006.01)
(52) U.S. Cl. ................. 524/430; 524/493; 524/445; 423/326
(58) Field of Classification Search ................. 524/492, 524/493, 495, 496, 430, 333.3; 525/332.4, 525/332.5, 333.3, 332.8, 332.9, 333.2
See application file for complete search history.

(56) References Cited

U.S. PATENT DOCUMENTS

| | | | |
|---|---|---|---|
| 3,768,537 A | 10/1973 | Hess et al. | |
| 3,873,489 A * | 3/1975 | Thurn et al. | 524/262 |
| 4,436,847 A | 3/1984 | Wagner | |
| 4,906,548 A * | 3/1990 | Uchide et al. | 430/126 |
| 6,140,393 A * | 10/2000 | Bomal et al. | 523/213 |
| 6,172,157 B1 * | 1/2001 | Araki et al. | 524/506 |
| 6,455,613 B1 | 9/2002 | Zimmer et al. | |
| 6,548,594 B2 | 4/2003 | Luginsland et al. | |
| 2003/0109614 A1 | 6/2003 | Luginsland et al. | |

FOREIGN PATENT DOCUMENTS

WO  WO 01/12732  2/2001

* cited by examiner

Primary Examiner—Katarzyna Wyrozebski
(74) Attorney, Agent, or Firm—Oblon, Spivak, McClelland, Maier & Neustadt, P.C.

(57) ABSTRACT

A modified oxidic or silicate filler, comprising:
at least one oxidic or silicate filler modified with a mercaptosilane of formula (I):

$$(R^1)_3Si-R^2-SH \text{ I,}$$

wherein the $R^1$ substituents are identical or different and consist of alkoxy or alkyl, with at least one $R^1$ group being an alkoxy group, and $R^2$ is a divalent hydrocarbon group, or modified with an alkylsilane of formula (II):

$$(R^1)_3Si-R^3 \text{ II,}$$

wherein $R^1$ is as defined above and $R^3$ represents a saturated or unsaturated, branched or unbranched alkyl radical, and/or modified with silicone oil.

25 Claims, No Drawings

SILANE-MODIFIED OXIDIC OR SILICATE-LIKE FILLER, PROCESS FOR ITS PREPARATION, AND ITS USE

BACKGROUND OF THE INVENTION

1. Field of the Invention

The present invention relates to a silane-modified oxidic or silicate-like filler, to a process for its preparation, and to its use.

2. Description of the Background

It is known to treat oxidic or silicate-like compounds with organosilicon compounds in order to strengthen the bond in filler-reinforced elastomers between the inorganic filler and the organic polymer used and hence to improve the properties of the fillers in the polymers.

It is known from DE 2141159, DE 2212239, U.S. Pat. No. 3,978,103 and U.S. Pat. No. 4,048,206 that sulfur-containing organosilicon compounds, such as bis-(3-triethoxysilylpropyl)tetrasulfane or 3-mercaptopropyltriethoxysilane, are used as a silane adhesion promoter or reinforcing additive in rubber mixtures filled with oxides, inter alia, for treads and other parts of motor vehicle tires. The use of mercaptosilanes in rubber mixtures for tire treads is known as disclosed in FR-A 152.094.859. In order to avoid the considerable problems encountered during the processing of mercaptosilanes, such as, for example, pre-scorch and plasticity behavior, mostly polysulfidic organosilanes coupling agents, such as, for example, bis-(3-triethoxysilylpropyl)tetrasulfane and bis-(3-triethoxysilylpropyl)disulfane (DE 2542534, DE 2405758, DE 19541404, DE 19734295) have been used in the manufacture of tire parts. These materials offer the best compromise for silica-filled vulcanizates with regard to vulcanization reliability, simple production and reinforcing efficiency.

The incorporation of additives, especially of the organosilanes and the unmodified fillers, into unvulcanised polymer mixtures can be done by various methods. The in situ process involves mixing fillers, such as carbon black and silica, organosilanes and polymer in a common mixing operation.

The ex situ process involves modifying the filler with the corresponding organosilane or with a mixture of different organosilanes before the filler is mixed with the polymer.

It is known that the surface of the filler can be modified by dissolution of the organosilicon compound in an organic solvent and subsequent treatment of fillers, for example, clays (U.S. Pat. No. 3,227,675).

A particularly useful method used extensively nowadays is liquid metering (U.S. Pat. No. 3,997,356) or the metering of the active filler via a pre-formed mixture of organosilane and filler (DE 3314742, U.S. Pat. No. 4,076,550). A disadvantage of such mixtures that have not been thermally pre-treated is the lack of storage stability and hence the lack of stability of the properties of the products.

U.S. Pat. No. 4,151,154 describes oxidic silicate-like fillers whose surface is subjected to treatment with two different types of organosilicon compound. The oxidic particles are so treated that they exhibit a greater affinity for water and are also more readily distributable in aqueous systems.

U.S. Pat. No. 3,567,680 discloses that it is known to modify kaolin suspended in water by means of various silanes. The described organosilicon compounds are water-soluble in the amounts required for the modification, however, so that treatment of the filler can in that case take place from an aqueous solution.

FR-A-2295958 relates to aryl polysulfides and mineral fillers treated with those compounds, which fillers are used in rubber mixtures. The preparation takes place in an aqueous/alcoholic formulation that contains from 99.9 to 80 wt. % alcohol.

EP-PS 01 26 871 discloses a process in which the surface of silicate-like fillers is modified with the aid of an aqueous emulsion of organosilicon compounds that are insoluble in water. The known silane-modified fillers have the disadvantage that their dynamic properties are no better than those of the fillers and silanes mixed in situ.

SUMMARY OF THE INVENTION

Accordingly, one object of the present invention is to provide a silane-modified oxidic or silicate-like filler that exhibits homogeneous coverage of the surface and that has improved dynamic properties in rubber as compared with rubber mixtures produced in situ.

Briefly, this object and other objects of the present invention as hereinafter will become more readily apparent can be attained by a silane-modified oxidic or silicate-like filler, comprising:

at least one oxidic or silicate-like filler modified with a mercaptosilane of formula (I):

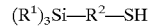

$$(R^1)_3Si—R^2—SH \qquad \text{I,}$$

wherein the $R^1$ substituents are identical or different and consist of alkoxy or alkyl, with at least one $R^1$ group being an alkoxy group, and $R^2$ is a divalent hydrocarbon group, or modified with an alkylsilane of formula (II):

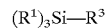

$$(R^1)_3Si—R^3 \qquad \text{II,}$$

wherein $R^1$ is as defined above and $R^3$ represents a saturated or unsaturated, branched or unbranched alkyl radical, and/or modified with silicone oil.

DETAILED DESCRIPTION OF THE PREFERRED EMBODIMENTS

In the compound of formula (I), $R^1$ preferably is methoxy, ethoxy or propoxy, or alkyl, with at least one $R^1$ group being an alkoxy group, and $R^2$ preferably is —CH$_2$—, —CH$_2$—CH$_2$—, —CH$_2$—CH$_2$—CH$_2$—, —CH$_2$—CH(CH$_3$)—CH$_2$—or—CH$_2$—CH$_2$—CH(CH$_3$)—.

The silane-modified oxidic or silicate-like filler can contain from 0.1 to 50.0 wt. %, preferably from 1.0 to 25.0 wt. %, particularly preferably from 1.0 to 8.0 wt. %, mercaptosilane and alkylsilane and/or silicone oil.

The silanes can be bonded to the surface of the filler chemically or physically.

The invention also provides a process for the preparation of the silane-modified oxidic or silicate-like filler according to the invention, wherein at least one oxidic or silicate-like filler is mixed with a mercaptosilane of formula I and an alkylsilane of formula II and/or with silicone oil.

The reaction can be conducted with or without a solvent, for example, methanol, ethanol, pentane, hexane, cyclohexane or toluene.

In the preparation of the filler of the invention the oxidic or silicate-like filler can be mixed first with the mercaptosilane and then with the alkylsilane and/or silicone oil, or vice versa. The mercaptosilane and the alkylsilane and/or silicone oil can first be mixed together and then mixed with the oxidic or silicate-like filler.

The mercaptosilane and alkylsilane and/or silicone oil can be sprayed onto the oxidic or silicate-like filler. The spray operation can be conducted preferably at a temperature from 10 to 50° C. The reaction, that is to say the reaction of the silanes with the silica, can take place at temperatures ranging from 50° to 200° C., preferably from 60° to 160° C. The reaction at elevated temperature can take place directly after the spraying (one-step) or in separate steps (two-steps).

The reaction can be conduced from 1 to 200 minutes, preferably from 1 to 30 minutes.

The oxidic or silicate-like filler and the mercaptosilane and alkylsilane and/or silicone oil can be circulated continuously in the process by means of a suitable stirring device. The stirring speed can be adapted to the temperature. Suitable stirring devices include lifting stirrers, blade stirrers, arm stirrers, perforated arm stirrers, cross-arm stirrers, anchor stirrers, grid stirrers, paddle rolls, propeller stirrers, screw stirrers, turbine stirrers, disk stirrers, planetary paddle stirrers, rotary mixers or impeller stirrers.

The stirring device can operate at stirring speeds ranging from 1 to 200 revolutions, lifting movements or circulations, per minute.

Following the surface modification, the silane-modified oxidic or silicate-like filler can be tempered. Suitable tempering temperatures range from 50° to 200° C., preferably from 50° to 160° C.

Suitable mercaptosilanes for use in the present invention include compounds of formula (I)

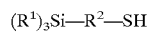  I, wherein substituents $R^1$ are identical or different and consist of alkoxy, preferably methoxy, ethoxy or propoxy, or alkyl, with at least one $R^1$ group being an alkoxy group, and $R^2$ represents a divalent hydrocarbon group, preferably —CH$_2$—, —CH$_2$—CH$_2$—, —CH$_2$—CH$_2$—CH$_2$—, —CH$_2$—CH(CH$_3$)—CH$_2$—, —CH$_2$—CH$_2$—CH(CH$_3$)—. Preferred specific mercaptosilanes include mercaptopropyltrimethoxysilane, mercaptopropyltriethoxy-silane, mercaptoethyltrimethoxysilane and mercaptoethyltriethoxysilane.

Suitable alkylsilanes for use in the invention include compounds of formula (II)

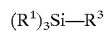  II, wherein $R^3$ represents a saturated or unsaturated, branched or unbranched alkyl radical. Preferred specific alkylsilanes include propyltriethoxysilane, butyltriethoxysilane, pentyltriethoxysilane, hexyltriethoxysilane, heptyltriethoxysilane, octyltriethoxysilane, hexadecyltriethoxysilane, octadecyltriethoxysilane, propyltrimethoxysilane, butyltrimethoxysilane, pentyltrimethoxysilane, hexyltrimethoxysilane, heptyltrimethoxy-silane, octyltrimethoxysilane, hexadecyltrimethoxysilane and octadecyltrimethoxysilane.

Suitable oxidic or silicate-like fillers that may be used in the invention include aluminum silicate, silicate, precipitated or pyrogenic silica having BET surface areas (measured using gaseous nitrogen) ranging from 1 to 1000 m$^2$/g, preferably up to 300 m$^2$/g.

For example, the precipitated silicas marketed by Degussa AG under the trade name Ultrasil (Ultrasil 7000 GR, Ultrasil VN 3, Ultrasil VN 3 GR, Ultrasil VN 2 and Ultrasil VN 2 GR) can be used.

The invention also provides rubber mixtures that are formulated so that they contain rubber, the silane-modified oxidic or silicate-like filler of the invention, optionally precipitated silica and/or carbon black and/or further rubber auxiliaries.

For the production of the rubber mixtures of the invention suitable rubber materials, in addition to natural rubber, also include synthetic rubbers. Preferred synthetic rubbers are described, for example, in W. Hofmann, Kautschuktechnologie, Genter Verlag, Stuttgart 1980. These rubbers include inter alia polybutadiene (BR), polyisoprene (IR), styrene/butadiene copolymers having styrene contents ranging from 1 to 60 wt. %, preferably from 5 to 50 wt. % (E- or S-SBR), isobutylene/isoprene copolymers (IIR), butadiene/acrylonitrile copolymers having acrylonitrile contents ranging from 5 to 60 wt. %, preferably from 10 to 50 wt. % (NBR), ethylene/propylene/diene copolymers (EPDM), as well as mixtures of these rubbers.

The rubber mixtures of the invention may also contain auxiliary materials for rubber products, such as, inter alia, reaction accelerators, reaction retardants, antioxidants, stabilizers, processing aids, plasticizers, waxes, metal oxides and also activators, such as triethanolamine, polyethylene glycol, hexanetriol.

The rubber auxiliaries can be used in conventional amounts, which are dependent inter alia on the intended use. Conventional amounts of these materials, for example, range from 0.1 to 50 wt. %, based on rubber.

Cross-linking agents may also be present and as such include the likes of sulfur, organic sulfur donors and free-radical generators. The rubber mixtures of the invention may also contain vulcaniation accelerators. Suitable examples of vulcanization accelerators include mercaptobenzthiazoles, sulfenamides, guanidines, thiurams, dithiocarbamates, thioureas, thiocarbonates and the like.

The vulcanization accelerators and cross-linkers can be used in amounts ranging from 0.1 to 10 wt. %, preferably from 0.1 to 5 wt. %, based on rubber.

Mixing of the rubbers with the filler, optional rubber auxiliaries and the organosilanes can be conducted in conventional mixing devices, such as rolls, kneaders and mixing extruders. Such rubber mixtures are conventionally produced in kneaders, wherein the rubbers, the silane-modified oxidic or silicate-like filler of the invention, optionally the carbon black and/or the silica and/or further rubber auxiliaries are first mixed at temperatures ranging from 100 to 170° C. in one or more successive thermomechanical mixing steps. The sequence of the addition and the time of addition of the individual components can have a decisive influence on the resulting properties of the mixture. The cross-linking chemicals are then conventionally added to the resulting rubber mixture in a kneader or on a roll at a temperature ranging from 40 to 110° C., and the material obtained is processed to the so-called raw mixture for the subsequent process steps, such as, for example, shaping and vulcanization.

Vulcanization of the rubber mixtures of the invention can take place at temperatures ranging from 80 to 2000° C., preferably from 130 to 180° C., optionally under a pressure ranging from 10 to 200 bar.

The rubber mixtures of the invention are suitable for the production of molded bodies, for example, for the production of pneumatic tires, tire treads, cable sheaths, hoses, drive belts, conveyor belts, roll coverings, tires, shoe soles, gaskets, profile sections and damping elements.

The silane-modified oxidic or silicate-like fillers of the invention have the advantage over the in situ mixtures of a lower viscosity, a higher modulus and improved dynamic properties.

Having generally described this invention, a further understanding can be obtained by reference to certain specific examples which are provided herein for purposes of illustration only and are not intended to be limiting unless otherwise specified.

EXAMPLES

Example 1

Preparation of the Silane-Modified Oxidic or Silicate-Like Filler B1

3,000 g of Ultrasil 7000 GR are placed in a Henschel mixer. 74 g of mercaptopropyltrimethoxysilane (VP Si 163) and 112.5 g of octyltriethoxysilane (VP Si 208) are sprayed in succession onto the Ultrasil 7000 GR at a temperature of 23° C., with stirring. The material is then removed from the Henschel mixer, and the mixer is heated to 120° C. The silica/silane mixture is then introduced into the hot mixer and reacted to completion for 30 minutes at 120° C., with stirring.

Example 2

Preparation of the Silane-Modified Oxidic or Silicate-Like Filler B2

3,000 g of Ultrasil 7000 GR are placed in a Henschel mixer. 74 g of mercaptopropyltrimethoxysilane (VP Si 163) and 112.5 g of octyltriethoxysilane (VP Si 208) are dissolved in 400 g of ethanol. The silane solution is sprayed onto the Ultrasil 7000 GR at temperatures of 23° C., with stirring. The material is then removed from the Henschel mixer, and the mixer is heated to 120° C. The silica/silane mixture is then introduced into the hot mixer and reacted to completion for 30 minutes at 120° C., with stirring.

Example 3

Rubber-technological Study of the Silane-modified Oxidic or Silicate-like Fillers The formulation used for the rubber mixtures is shown in Table 1 below. In that Table, the unit phr denotes parts by weight, based on 100 parts of the raw rubber used. The general process for the production of rubber mixtures and vulcanates thereof is described in the book: "Rubber Technology Handbook", W. Hofmann, Hanser Verlag 1994.

TABLE 1

|  | Mixture 1 Reference | Mixture 2 | Mixture 3 |
|---|---|---|---|
| 1st Step |  |  |  |
| Buna VSL 5025-1 | 96 | 96 | 96 |
| Buna CB 24 | 30 | 30 | 30 |
| Ultrasil 7000 GR | 80 | — | — |
| Example B1 | — | 82 | — |
| Example B2 | — | — | 82 |
| VP Si 163 | 1.98 | — | — |
| VP Si 208 | 2.5 | — | — |
| ZnO | 3 | 3 | 3 |
| Stearic acid | 2 | 2 | 2 |
| Naftolen | 10 | 10 | 10 |
| Vulkanox 4020 | 1.5 | 1.5 | 1.5 |
| Protektor G35P | 1 | 1 | 1 |
| 2nd Step |  |  |  |
| Step 1 batch |  |  |  |
| 3rd Step |  |  |  |
| Step 2 batch |  |  |  |
| Vulkacit D | 2 | 2 | 2 |
| Vulkazit CZ | 1.5 | 1.5 | 1.5 |
| Sulfur | 2.3 | 2.3 | 2.3 |

The polymer VSL 5025-1 is a solution-polymerised SBR copolymer, which is obtained from Bayer AG, having a styrene content of 25 wt. % and a butadiene content of 75 wt. %. The copolymer contains 37.5 phr oil and has a Mooney viscosity (ML 1+4/100° C.) of 50±4.

The polymer Buna CB 24 is a cis-1,4-polybutadiene (neodymium type), which is obtained from Bayer AG, having a cis-1,4 content of at least 97%, a 1,2 content of 1% and a Mooney viscosity of 44±5.

Naftolen ZD from Chemetall is used as the aromatic oil. Vulkanox 4020 is 6PPD from Bayer AG, and Protektor G35P is an antiozonant wax from HB-Fuller GmbH. Vulkacit D (DPG) and Vulkazit CZ (CBS) are commercial products, which are obtained from Bayer AG.

Ultrasil 7000 GR is a readily dispersible precipitated silica, which is obtained from Degussa AG, having a BET surface area of 170 $m^2/g$. VP Si 163, mercaptopropyltrimethoxysilane, and VP Si 208, octyltriethoxysilane, are commercial products, which are obtained from Degussa AG.

The rubber mixtures are produced in a kneader according to the mixing procedure described in Table 2.

TABLE 2

| Step 1 | |
|---|---|
| Settings | |
| Mixing device | Werner & Pfleiderer E type |
| Speed | 70 $min^{-1}$ |
| Ram pressure | 5.5 bar |
| Volume when empty | 1.58 l |
| Degree of filling | 0.56 |
| Flow temp. | 70° C. |
| Mixing procedure | |
| 0 to 1 min | Buna VSL 5025-1 + Buna CB 24 |
| 1 to 3 min | 1/2 filler, ZnO, stearic acid, Naftolen ZD silane |
| 3 to 4 min | 1/2 filler, antioxidant |
| 4 min | clean |
| 4 to 5 min | mix, optionally adjust speed |
| 5 min | clean |
| 5 to 6 min | mix and complete the operation |
| Batch temp. | 145–150° C. |
| Storage | 24 h at room temperature |
| Step 2 | |
| Settings | |
| Mixing device | as in Step 1 except for: |
| Speed | 80 $min^{-1}$ |
| Flow temp. | 80° C. |
| Degree of filling | 0.53 |
| Mixing procedure | |
| 0 to 2 min | break up Step 1 batch |
| 2 to 5 min | maintain batch temperature of 150° C. by varying speed |
| 5 min | complete the operation |
| Batch temp. | 150° C. |
| Storage | 4 h at room temperature |

TABLE 2-continued

Step 3

| Settings | |
|---|---|
| Mixing device | as in Step 1 except for |
| Speed | 40 min$^{-1}$ |
| Degree of filling | 0.51 |
| Flow temp. | 50° C. |

| Mixing procedure | |
|---|---|
| 0 to 2 min | Step 2 batch, accelerator, sulfur |
| 2 min | complete the operation and form rolled sheet on set of laboratory mixing rolls, (diameter 200 mm, length 450 mm, flow temperature 50° C. homogenization: cut in 3* on the left, 3* on the right and fold over, and roll 8* with a narrow roll gap (1 mm) and 3* with a wide roll gap (3.5 mm) draw out rolled sheet |
| Batch temp. | 85–95° C. |

The methods for testing the rubber are summarized in Table 3.

TABLE 3

| Physical testing | Standard/conditions |
|---|---|
| ML 1 + 4, 100° C., 3$^{rd}$ Step | DIN 53523/3, ISO 667 |
| Vulcameter test, 165° C. | DIN 53529/3, ISO 6502 |
| Dmax-Dmin (dNm) | |
| t10% and t90% (min) | |
| t80%–t20% (min) | |
| Ring tensile test, 23° C. | DIN 53504, ISO 37 |
| Tensile strength (MPa) | |
| Tensile stress (MPa) | |
| Ultimate elongation (%) | |
| Shore A hardness, 23° C. (SH) | DIN 53 505 |
| Viscoelastic properties MTS, 0 to 60° C., 16 Hz, 50 N preliminary force and 25 N amplitude force | DIN 53 513, ISO 2856 |
| Complex modules E* (MPa) | |
| Loss modulus E" (MPa) | |
| Loss factor tan δ() | |
| Ball rebound, 23° C. (%) | ASTM D 5308 |
| DIN abrasion, 10 N force (mm³) | DIN 53 516 |
| Dispersion ( ) (Phillips) | ISO/DIS 11345 |
| Goodrich flexometer 0.250 inch, 25 min, 23° C. | DIN 535333; ASTM D 623 A |
| Contact temperature (° C.) | |
| Center temperature (° C.) | |
| Permanent set (%) | |

Table 4 shows the results of the rubber-technological test. The mixtures are vulcanized for 20 minutes at 165° C.

TABLE 4

| Characteristic | Unit: | in situ Reference 1 | 2 | 3 |
|---|---|---|---|---|
| Raw mixture results | | | | |
| Batch temperature 1$^{st}$ Step | [° C.] | 145 | 143 | 151 |
| Batch temperature 2$^{nd}$ Step | [° C.] | 145 | 146 | 145 |
| ML (1 + 4) at 100° C., 1st Step | [ME] | 140 | 120 | 111 |
| ML (1 + 4) at 100° C., 2nd Step | [ME] | 74 | 79 | 78 |
| ML (1 + 4) at 100° C., 3rd Step | [ME] | 58 | 62 | 67 |

TABLE 4-continued

| Characteristic | Unit: | in situ Reference 1 | 2 | 3 |
|---|---|---|---|---|
| MDR, 165° C. | | | | |
| Dmax-Dmin | [dNm] | 12.6 | 14.7 | 14.2 |
| t 10% | [min] | 1.0 | 0.8 | 0.9 |
| t 90% | [min] | 13.8 | 7.2 | 6.6 |
| t 80%–t 20% | [min] | 6.0 | 2.8 | 2.7 |
| Vulcanate results | | | | |
| Characteristic: | Unit: | 1 | 2 | 3 |
| Ring tensile test | | | | |
| Tensile strength | [MPa] | 14.2 | 14.3 | 13.9 |
| Tensile stress 100% | [MPa] | 1.4 | 1.8 | 1.9 |
| Tensile stress 300% | [MPa] | 8.7 | 10.7 | 11.8 |
| Tensile stress 300%/100% | [–] | 6.2 | 5.9 | 6.2 |
| Ultimate elongation | [%] | 390 | 360 | 330 |
| Energy at break | [J] | 66.1 | 63.4 | 56.2 |
| Shore A hardness | [SH] | 55 | 59 | 59 |
| Ball rebound, 23° C. | [%] | 38.1 | 34.8 | 33.9 |
| DIN abrasion | [mm³] | 72 | 76 | 67 |
| Goodrich flexometer Lift: 0.250 inch; 25 min; 23° C. | | | | |
| Contact temperature | [° C.] | 57 | 58 | 58 |
| Center temperature | [° C.] | 99 | 100 | 100 |
| Permanent set | [%] | 3.6 | 3.2 | 3.0 |
| MTS | | | | |
| Complex modulus E*, 0° C. | [MPa] | 11.5 | 15.1 | 15.9 |
| Complex modulus E*, 60° C. | [MPa] | 6.1 | 7.2 | 7.2 |
| Loss modulus E", 0° C. | [MPa] | 4.3 | 6.1 | 6.6 |
| Loss modulus E", 60° C. | [MPa] | 0.5 | 0.6 | 0.6 |
| Loss factor tan δ, 0° C. | [–] | 0.404 | 0.439 | 0.458 |
| Loss factor tan δ, 60° C. | [–] | 0.081 | 0.078 | 0.081 |
| Phillips dispersion | [–] | 8 | 7 | 7 |

As is evident from the data presented in Table 4, the rubber values profile of the mixture (2+3) containing the silane-modified oxidic or silicate-like fillers according to the invention is superior to that of the in situ reference (1). The lower Mooney viscosity, the higher tensile stress values and the lower tan δ (60° C.) values inter alia are evidence of an improvement as compared with the in situ mixture.

Example 4

Preparation of the Silane-Modified Oxidic or Silicate-Like Filler B3

3,000 g of Ultrasil 7000 GR are placed in a Henschel mixer. 150 g of DOW 50 (silicone oil of $M_n$=3700 g/mol) and 90 g of Dynasylan 3201 (mercaptopropyltriethoxysilane) are sprayed in succession onto the Ultrasil 7000 GR at 22° C., with stirring. The material is then removed from the Henschel mixer, and the mixer is subsequently heated to 120° C. The Henschel mixer is then filled with the silica/silane mixture, and the silane coupling reaction is conducted for 30 minutes at 120° C., with stirring.

Example 5

Preparation of the Silane-Modified Oxidic or Silicate-Like Filler B4

3,000 g of Ultrasil 7000 GR are placed in a Henschel mixer. 60 g of VP Si 216 (hexadecyltriethoxysilane) and 90 g of Dynasylan 3201 are sprayed in succession on to the Ultrasil 7000 GR at 22° C., with stirring. The material is then removed from the Henschel mixer, and the mixer is subsequently heated to 120° C. The Henschel mixer is then filled with the silica/silane mixture, and the silane coupling reaction is conducted for 30 minutes at 120° C., with stirring.

Example 6

Preparation of the Silane-Modified Oxidic or Silicate-Like Filler B5

3,000 g of Ultrasil 7000 GR are placed in a Henschel mixer. 60 g of VP Si 216 are sprayed onto the Ultrasil 7000 GR at 22° C., with stirring. The material is then removed from the Henschel mixer, and the mixer is subsequently heated to 120° C. The Henschel mixer is then filled with the silica/silane mixture, and the silane coupling reaction is conducted for 30 minutes at 120° C., with stirring.

In a 2nd step, the resulting product is placed in the Henschel mixer, and 90 g of Dynasylan 3201 are sprayed onto the product at 22° C., with stirring. The material is then removed from the Henschel mixer, and the mixer is subsequently heated to 120° C. The Henschel mixer is then filled with the silica/silane mixture, and the silane coupling reaction is carried out for 30 minutes at 120° C., with stirring.

Example 7

Rubber-technological Study of the Silane-modified Oxidic or Silicate-like Fillers

The formulation used for the rubber mixtures is shown in Table 5 below. In that Table, the unit phr denotes parts by weight, based on 100 parts of the raw rubber used.

TABLE 5

|  | Mixture 4 Reference | Mixture 5 Reference | Mixture 6 Reference | Mixture 7 Reference | Mixture 8 | Mixture 9 | Mixture 10 |
|---|---|---|---|---|---|---|---|
| 1st Step |  |  |  |  |  |  |  |
| Buna VSL 5025-1 | 96 | 96 | 96 | 96 | 96 | 96 | 96 |
| Buna CB 24 | 30 | 30 | 30 | 30 | 30 | 30 | 30 |
| Ultrasil 7000 GR | 80 | 80 | 80 | — | — | — | — |
| Coupsil 8108 | — | — | — | 86 | — | — | — |
| Example B3 | — | — | — | — | 86 | — | — |
| Example B4 | — | — | — | — | — | 83.4 | — |
| Example B5 | — | — | — | — | — | — | 83.4 |
| Dynasylan 3201 | — | 2.4 | 2.4 | — | — | — | — |
| Si 69 | 6.4 | — | — | — | — | — | — |
| Si 216 | — | 1.6 | — | — | — | — | — |
| DOW 50 | — | — | 4 | — | — | — | — |
| ZnO | 3 | 3 | 3 | 3 | 3 | 3 | 3 |
| Stearic acid | 2 | 2 | 2 | 2 | 2 | 2 | 2 |
| Naftolen | 10 | 10 | 10 | 10 | 10 | 10 | 10 |
| Vulkanox 4020 | 1.5 | 1.5 | 1.5 | 1.5 | 1.5 | 1.5 | 1.5 |
| Protektor G35P | 1 | 1 | 1 | 1 | 1 | 1 | 1 |
| 2nd Step |  |  |  |  |  |  |  |
| Step 1 batch |  |  |  |  |  |  |  |
| 3rd Step |  |  |  |  |  |  |  |
| Step 2 batch |  |  |  |  |  |  |  |
| Vulkacit D | 2 | 2 | 2 | 2 | 2 | 2 | 2 |
| Vulkazit CZ | 1.5 | 1.5 | 1.5 | 1.5 | 1.5 | 1.5 | 1.5 |
| Sulfur | 1.5 | 2.3 | 2.3 | 1.5 | 2.3 | 2.3 | 2.3 |

Coupsil 8108 GR is a silica pre-silanized with 8% Si 69, based on Ultrasil VN3 GR from Degussa AG.

Dynasylan 3201, 3-mercaptopropyltriethoxysilane, VP Si 216, hexadecyltriethoxysilane, and Si 69, bis-(3-[triethoxysilyl]propyl)tetrasulfane, are commercial products from Degussa AG. DOW 50 is a silicone oil of $M_n$=3700 g/mol from DOW Chemicals.

The rubber mixtures are produced in an intimate mixer according to the mixing procedure in Table 2.

Testing of the rubber is conducted according to the methods in Table 3.

Tables 6a and 6b show the results of the rubber-technological test. The mixtures are vulcanized for 20 minutes at 165° C.

TABLE 6a

| | Mixture | 4 | 5 | 6 | 7 | 8 | 9 | 10 |
|---|---|---|---|---|---|---|---|---|
| Raw mixture results | | | | | | | | |
| Characteristic | Unit | Ref Si 69 | Si 263 Si 216 | Si 263 DOW 50 | Coupsil 8108 GR | | | |
| Batch temp. 1st Step | [° C.] | 139 | 149 | 148 | 138 | 143 | 145 | 140 |
| Batch temp. 2nd Step | [° C.] | 153 | 150 | 148 | 154 | 150 | 150 | 155 |
| ML(1 + 4) at 100° C., 2nd Step | [ME] | 67 | 77 | 76 | 96 | 99 | 104 | 96 |
| ML(1 + 4) at 100° C., 3rd Step | [ME] | 62 | 60 | 63 | 83 | 74 | 74 | 77 |
| MDR, 165° C. | | | | | | | | |
| Dmax-Dmin | [dNm] | 16.42 | 13.63 | 13.87 | 23.2 | 22.1 | 19.89 | 19.06 |
| t 10% | [min] | 1.7 | 1.05 | 0.81 | 0.84 | 0.6 | 0.64 | 0.74 |
| t 90% | [min] | 12.54 | 13.62 | 17.27 | 14.94 | 10.68 | 12.71 | 14.25 |
| t 80%–t 20% | [min] | 5.01 | 5.66 | 7.3 | 5.29 | 4.3 | 4.83 | 5.6 |
| Vulcanate results | | | | | | | | |
| Characteristic | Unit | | | | | | | |
| Ring tensile test | | | | | | | | |
| Tensile strength | [MPa] | 13.4 | 14.2 | 12.1 | 13.9 | 11.1 | 10.9 | 12.9 |
| Tensile stress 100% | [MPa] | 1.7 | 1.6 | 1.7 | 2.1 | 2.0 | 1.9 | 2.1 |
| Tensile stress 300% | [MPa] | 9.0 | 10.2 | 10.7 | 8.8 | 11.1 | 10.6 | 12.9 |
| Tensile stress 300%/100% | [—] | 5.3 | 6.4 | 6.3 | 4.2 | 5.6 | 5.6 | 6.1 |
| Ultimate elongation | [%] | 380 | 360 | 320 | 400 | 300 | 310 | 300 |
| Energy at break | [J] | 63.4 | 62.5 | 45.6 | 75.2 | 43.0 | 43.5 | 47.7 |
| Shore A hardness | [SH] | 62 | 56 | 57 | 68 | 67 | 63 | 62 |
| Ball rebound, 23° C. | [%] | 60.9 | 69.5 | 69.5 | 60.7 | 66.8 | 67.8 | 67.6 |
| DIN abrasion | [mm$^3$] | 85 | 66 | 77 | 104 | 83 | 83 | 66 |

TABLE 6b

| | | | | | | | | |
|---|---|---|---|---|---|---|---|---|
| Goodrich flexometer, lift: 0.250 inch | | | | | | | | |
| Contact temperature | [° C.] | 71 | 59 | 63 | 81 | 68 | 70 | 70 |
| Center temperature | [° C.] | 115 | 98 | 99 | 126 | 103 | 108 | 105 |
| Permanent set | [%] | 6.0 | 2.8 | 3.4 | 7.5 | 4.4 | 5.5 | 4.0 |
| MTS | | | | | | | | |
| Complex modulus E*, 0° C. | [MPa] | 13 | 9.8 | 10.4 | 19.8 | 19.6 | 13.9 | 13.6 |
| Complex modulus E*, 60° C. | [MPa] | 6.1 | 5.5 | 5.6 | 7.7 | 7 | 6.4 | 6.4 |
| Loss modulus E", 0° C. | [MPa] | 5.5 | 3.8 | 4.1 | 9 | 9.3 | 6.1 | 5.9 |
| Loss modulus E", 60° C. | [MPa] | 0.8 | 0.6 | 0.6 | 1.1 | 0.9 | 0.7 | 0.7 |
| Loss factor tan δ 0° C. | [–] | 0.473 | 0.422 | 0.433 | 0.51 | 0.534 | 0.489 | 0.487 |
| Loss factor tan δ 60° C. | [–] | 0.13 | 0.101 | 0.107 | 0.144 | 0.133 | 0.112 | 0.108 |
| Phillips dispersion | [–] | 8 | 8 | 9 | 6 | 8 | 7 | 7 |

If the vulcanate data of mixtures 8 to 10 of the silane-modified oxidic or silicate-like fillers of the invention are compared with the in situ Si69 reference mixture 4, the modulus values and reinforcing factors are increased. The dynamic values of mixtures 8 to 10 are improved (moderate dynamic stiffness and low hysteresis loss).

The disclosure of German priority application 101 32 943.1 filed Jul. 6, 2001, is hereby incorporated by reference into the present application.

Obviously, numerous modifications and variations of the present invention are possible in light of the above teachings. It is therefore to be understood that within the scope of the appended claims, the invention may be practiced otherwise than as specifically described herein.

What is claimed as new and is intended to be secured by Letters Patent is:

1. A modified oxidic or silicate filler powder, consisting essentially of:

at least one oxidic or silicate filler modified with a mercaptosilane of formula (I)

$(R^1)_3Si—R^2—SH$ 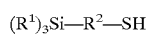 I, wherein the $R^1$ substituents are identical or different and are alkoxy or alkyl, with at least one $R^1$ group being an alkoxy group, and $R^2$ is a divalent hydrocarbon group; and at least one alikylsilane of formula (II)

$(R^1)_3Si—R^3$  II, wherein $R^1$ is as defined above and $R^3$ represents a saturated or unsaturated, branched or unbranched alkyl radical.

2. The modified oxidic or silicate filler powder of claim 1, wherein the filler is modified by combining the mercaptosilane and the alkylsilane with the filler in an amount of from 0.1 to 50.0 wt. %.

3. The modified oxidic or silicate filler powder of claim 2, wherein the filler is modified by combining the mercaptosilane and the alkylsilane with the filler in an amount of from 1.0 to 25.0 wt. %.

4. The modified oxidic or silicate filler powder of claim 1, wherein the mercaptosilane is at least one selected from the group consisting of mercaptopropyltrimethoxysilane, mercaptopropyltriethoxysilane, mercaptoethyltrimethoxysilane and mercaptoethyl-triethoxysilane.

5. The modified oxidic or silicate filler powder of claim 1, wherein the alkylsilane is at least one selected from the group consisting of propyltriethoxysilane, butyltriethoxysilane, pentyltriethoxysilane, hexyltriethoxysilane, heptyltriethoxysilane, octyltriethoxysilane, hexadecyl-triethoxysilane, octadecyltriethoxysilane, propyltrimethoxy-silane, butyltrimethoxysilane, pentyl-trimethoxysilane, hexyltrimethoxysilane, heptyltrimethoxy-silane, octyltrimethoxysilane, hexadecyltrimethoxysilane and octadecyltrimethoxysilane.

6. The modified oxidic or silicate filler powder of claim 1, wherein the oxidic or silicate filler is at least one member selected from the group consisting of aluminum silicate, silicate, precipitated and pyrogenic silica having a BET surface area of from 1 to 1,000 $m^2/g$.

7. A method of preparing the modified oxidic or silicate filler powder of claim 1, which comprises:
mixing and reacting an oxidic or silicate filler with at least one mercaptosilane of formula I, and at least one atkylsilane of formula II.

8. The method of claim 7, wherein the reacting is conducted at a temperature of from 0 to 200° C.

9. The method of claim 8, wherein the reacting is conducted at a temperature of from 60 to 160° C.

10. The method of claim 7, wherein the reacting is conducted for a time of from 1 to 200 minutes.

11. The method of claim 7, wherein the reacting is conducted in the absence of a solvent.

12. The method of claim 7, wherein the reacting is conducted in the presence of a solvent.

13. A rubber-based formulation, comprising:
one or more of a natural or synthetic rubber and the modified oxidic or silicate filler powder of claim 1.

14. The rubber-based formulation of claim 13, comprising at least one synthetic rubber selected from the group consisting of polybutadiene, polyisoprene, styrene/butadiene copolymers having a styrene content of from 1 to 60 wt. %, isobutylene/isoprene copolymers, butadiene/acrylonitrile copolymers having an acrylonitrile content of from 5 to 60 wt. %, ethylene/propylene/diene copolymers and mixtures of these rubbers.

15. The rubber-based formulation of claim 13, further comprising at least one rubber auxiliary selected from the group consisting of reaction accelerators, reaction retardants, antioxidants, stabilizers, processing aids, plasticisers, waxes, metal oxides and activators.

16. The rubber-based formulation of claim 15, comprising at least one rubber auxiliary in an amount of from 0.1 to 50 wt. %, based on the rubber component.

17. The rubber-based formulation of claim 13, further comprising at least one vulcanization accelerator selected from the group consisting of mercaptobenzthiazoles, sulfenamides, guanidines, thiurams, dithiocarbamates, thioureas and thiocarbonates.

18. The rubber-based formulation of claim 13, further comprising at least one cross-linking agent selected from the group consisting of sulfur, an organic sulfur donor and a free-radical generator.

19. A method of preparing a molded rubber product, comprising:
thermomechanically mixing a natural or synthetic rubber with the modified oxidic or silicate filler powder of claim 1; and then
shaping and vulcanizing the mixed material.

20. The method of claim 19, wherein the thermomechanical mixing occurs at a temperature of from 80° to 200° C. at a pressure of from 10 to 200 bar.

21. The method of claim 20, wherein the thermomechanical mixing occurs at a temperature of from 130° to 180° C.

22. The formulation of claim 13, further comprising at least one of a precipitated silica, carbon black or a rubber auxiliary.

23. The formulation of claim 15, comprising at least one activator selected from the group consisting of triethanolamine, polyethyleneglycol and hexanetriol.

24. The method of claim 19, wherein the natural or synthetic rubber is mixed with the modified oxidic or silicate filler powder and at least one of a precipitated silica, carbon black, or rubber auxiliary.

25. The modified oxidic or silicate filler of claim 1, wherein the oxidic or silicate filler powder is modified with a mercaptosilane of formula (I), an alkylsilane of formula (II) and a silicone oil.

* * * * *